March 22, 1949.　　　W. A. RAY　　　2,464,942
ORIFICE CARTRIDGE
Filed Dec. 17, 1946
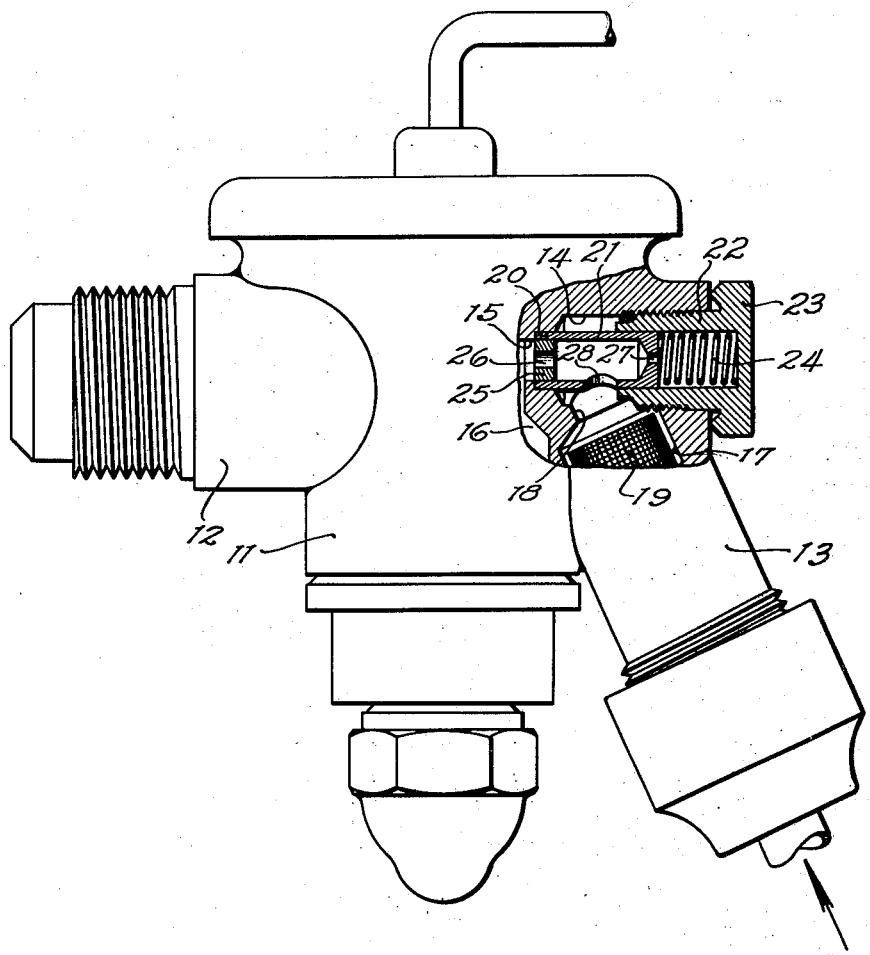
INVENTOR,
WILLIAM A. RAY
By
John H. Rouse,
ATTORNEY.

Patented Mar. 22, 1949

2,464,942

UNITED STATES PATENT OFFICE 2,464,942

ORIFICE CARTRIDGE

William A. Ray, North Hollywood, Calif., assignor to General Controls Co., Glendale, Calif., a corporation of California Application December 17, 1946, Serial No. 716,682

2 Claims. (Cl. 138—45)

This invention relates to means for determining the flow capacity of valves, in particular, those of the thermal-expansion type employed in refrigerating systems. In such systems it is necessary that the valve be exactly "sized" to meet the particular conditions of operation and the valve is therefore usually provided with a fitting, having an orifice controlling flow through the valve, which may be removed and replaced by another having an orifice of suitable size if it is desired to change the flow capacity of the valve. This necessitates maintenance by the installer of a relatively large supply of extra orifice fittings, some of which may never be used, and the production by the manufacturer of many additional parts.

It is therefore an object of this invention to reduce such waste and the possibility of failure of the installer to have the proper orifice-fitting on hand when needed; this object being accomplished by the provision of a readily removable-and-replaceable orifice-fitting or -cartridge whose flow capacity can be altered by the installer.

For full understanding of the invention, and further appreciation of its features and advantages, reference is to be had to the following detailed description and accompanying drawing, and to the appended claims.

The single figure of the drawing is a front elevation of a thermal-expansion valve; a portion of the body of the valve being broken away to show, in section, an orifice-cartridge embodying my present invention.

The thermal-expansion valve shown in the drawing may be similar in construction to that shown in Matteson Patent No. 2,327,542, issued August 24, 1943, and comprises a body 11 having an inclined inlet projection 13 and a horizontal outlet projection 12. Leading from the exterior of the valve body is a bore 14 having a reduced inward extension 15 which communicates with a valve chamber 16. The inlet passage 17 of the valve is connected by a reduced extension 18 to the bore 14, there being in the passage 17 the usual strainer 19.

Between the bore 14 and its extension 15 is a shallow circular recess wherein one end of a hollow cylindrical member 21 is seated, the other end portion of the member being supported in the hollow of a tubular screw 22 threaded in the outer end of bore 14 and having a head 23 formed to sealingly engage the outer surface of the valve body; a compression spring 24 in the hollow of the screw serving to maintain the member 21 seated.

Pressed in the left-hand end of member 21 is a plug 25 providing an orifice 26, and in the opposite end wall of the member is another orifice 27 which differs in size from that of orifice 26. In the side wall of member 21 is a relatively large aperture 28 whereby the interior of the member is placed in communication with bore 14, and hence with the inlet of the valve. More than one such aperture may be provided if desired.

With the parts in the positions as shown in the drawing, the flow capacity of the valve is determined by the size of orifice 26, since fluid entering the valve must pass by way of bore 14 and aperture 28 to the interior of the orifice-member 21 and thence through the orifice 26 to the bore-extension 15 and valve-chamber 16. To change the flow capacity of the valve, the screw 22 is removed and along with it the member 21, this member then being reversed end-for-end and remounted in the valve, the capacity of the valve then being determined by orifice 27.

The specific embodiment of my invention herein shown and described is susceptible of modification without departing from the spirit of the invention, and I intend therefore to be limited only by the scope of the appended claims.

I claim as my invention:

1. An orifice cartridge for restricting flow through a valve-passage, comprising: an elongated hollow member having like end portions adapted to be connected, interchangeably, to an end of said passage; there being in each of the ends of said member an orifice of respectively different size, and in the side wall of the member an aperture or apertures, communicating with said orifices, whose flow capacity is at least equal to that of the larger of the orifices.

2. An orifice cartridge for restricting flow through a valve-passage, comprising: an elongated hollow cylindrical member having like end portions adapted to be connected, interchangeably, to an end of said passage; there being in each of the ends of said member an orifice of respectively different size, and in the side wall of the member an aperture or apertures, communicating through the hollow of the member with said orifices, whose flow capacity is greater than that of the larger of the orifices; the flow capacity of the hollow of the member also being greater than that of the larger of the orifices.

WILLIAM A. RAY.

REFERENCES CITED

The following references are of record in the file of this patent:

UNITED STATES PATENTS

| Number | Name | Date |
| --- | --- | --- |
| 2,327,542 | Matteson | Aug. 24, 1943 |